United States Patent
Langerhans et al.

(10) Patent No.: US 7,245,484 B2
(45) Date of Patent: Jul. 17, 2007

(54) METHOD AND APPARATUS FOR SPACING A DISPLAY FROM A CHASSIS IN AN INFORMATION HANDLING SYSTEM

(75) Inventors: Ronald Paul Langerhans, Austin, TX (US); Michael Ralph Garel, Austin, TX (US); Yu Li Liao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 10/941,120

(22) Filed: Sep. 15, 2004

(65) Prior Publication Data

US 2006/0058077 A1    Mar. 16, 2006

(51) Int. Cl.
*G06F 1/16*    (2006.01)

(52) U.S. Cl. .................. 361/683; 455/575.1; 248/615; 248/638

(58) Field of Classification Search ............. 455/575.1; 361/683; 248/118, 562, 560, 683, 615, 188.8, 248/638; 147/50, 58; 174/50, 58
See application file for complete search history.

(56) References Cited

U.S. PATENT DOCUMENTS

| | | | | |
|---|---|---|---|---|
| 3,288,405 A | * | 11/1966 | Johnson | 248/615 |
| 3,426,986 A | * | 2/1969 | Clarence | 248/188.8 |
| 4,879,857 A | * | 11/1989 | Peterson et al. | 52/403.1 |
| 5,153,052 A | * | 10/1992 | Tanaka et al. | 248/615 |
| 5,169,115 A | * | 12/1992 | Chung Hsiang | 248/188.8 |
| 6,297,947 B1 | * | 10/2001 | Howell et al. | 361/683 |
| 6,327,142 B1 | * | 12/2001 | Cronk | 361/683 |
| 6,353,531 B1 | * | 3/2002 | Howell et al. | 361/683 |
| 6,357,717 B1 | * | 3/2002 | Kennard, IV | 248/638 |
| 6,439,519 B1 | * | 8/2002 | Takamasa | 248/188.8 |
| 6,493,218 B1 | * | 12/2002 | Fraga et al. | 361/683 |
| 6,498,719 B1 | * | 12/2002 | Bridges | 361/680 |
| 6,522,763 B2 | * | 2/2003 | Burleson et al. | 381/189 |
| 6,659,411 B2 | * | 12/2003 | Araki | 248/188.8 |
| 6,714,405 B2 | * | 3/2004 | Jitsukawa | 361/683 |
| 6,775,128 B2 | | 8/2004 | Leitao | |
| 6,795,306 B2 | * | 9/2004 | Jeffries et al. | 361/683 |
| 6,798,648 B2 | * | 9/2004 | Sasaki et al. | 361/683 |
| 6,809,916 B2 | * | 10/2004 | Nakata et al. | 361/683 |
| 6,979,778 B2 | * | 12/2005 | Xiong et al. | 174/50 |
| 2002/0172002 A1 | * | 11/2002 | Sasaki et al. | 361/683 |

* cited by examiner

*Primary Examiner*—Lisa Lea-Edmonds
(74) *Attorney, Agent, or Firm*—Haynes and Boone, LLP

(57) ABSTRACT

A spacer apparatus comprises a rigid base member including a stop surface located on a top portion of the base member and a resilient member coupled to the rigid base member, the resilient member positioned adjacent the stop surface. The spacer apparatus may be installed in an information handling system to limit damage to the display and the engaging surfaces of the information handling system.

25 Claims, 4 Drawing Sheets

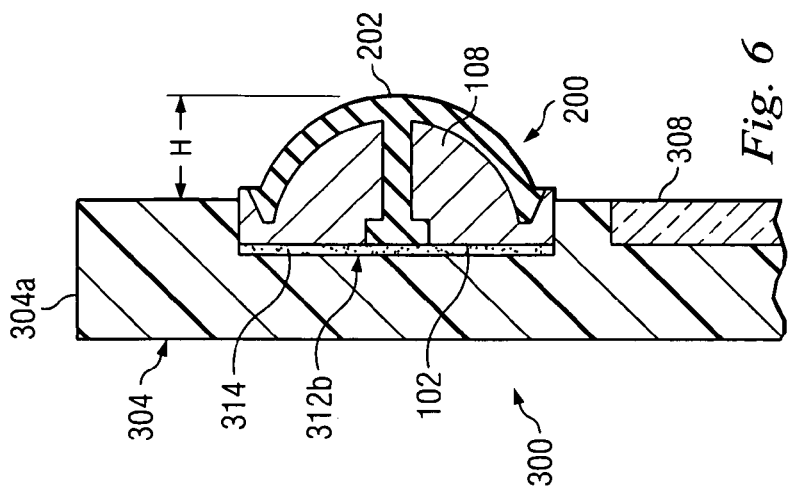
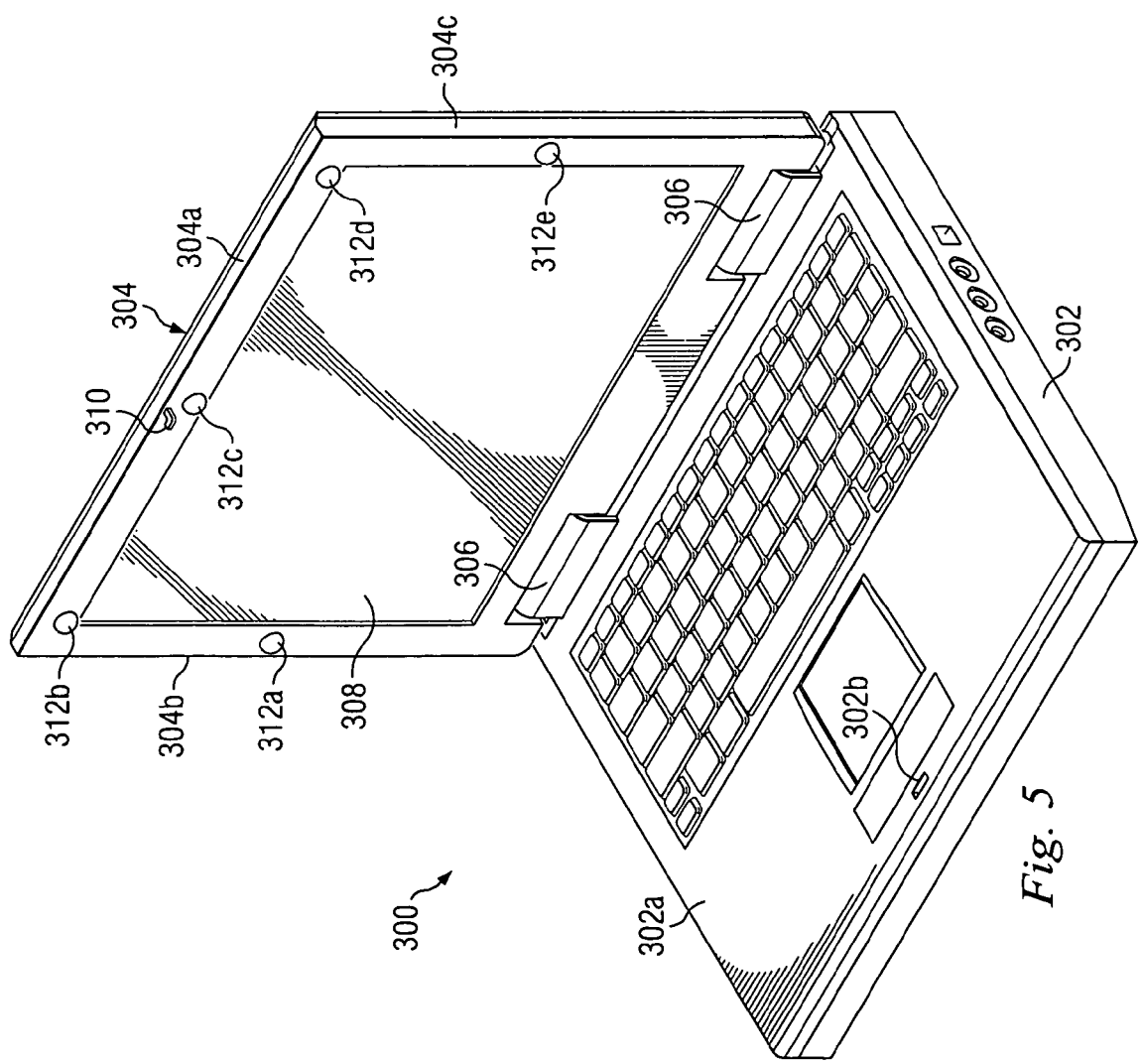
Fig. 6
Fig. 5

METHOD AND APPARATUS FOR SPACING A DISPLAY FROM A CHASSIS IN AN INFORMATION HANDLING SYSTEM

BACKGROUND

The present disclosure relates generally to information handling systems, and more particularly to a method and apparatus for spacing a display from a chassis in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For particular applications, such as those involving portability, information handling systems are designed to be as light and thin as possible. To achieve minimal heights for the systems, the gap between the display assembly and the chassis base is designed to be as small as possible when the display is not in use and is secured to the chassis base. In this configuration, pressure to the back of the display assembly can close the gap between the display and the chassis base, causing the display to contact the chassis base or components on the chassis base. This can cause damage to the display, which may be one of the most expensive components of the system.

Traditionally, rubber bumpers have been provided to limit the display assembly from contacting the chassis base. However, when the pressure to the back of the display assembly is sufficient, these rubber bumpers may compress and allow the display apparatus to close the gap and contact the chassis base.

Accordingly, it would be desirable to provide an improved spacer apparatus in an information handling system absent the disadvantages found in the prior methods discussed above.

SUMMARY

According to one embodiment, a spacer apparatus is provided that includes a rigid base member including a stop surface located on a portion of the base member, a resilient member positioned to cover the stop surface, and means for connecting the resilient member and the rigid base member.

A principal advantage of this embodiment is that, when the spacer apparatus is installed in an information handling system, the stop surface limits the display in the information handling system from closing the gap between it and the chassis base and causing damage to the display, while the resilient member prevents damage to the engaging surfaces on the chassis.

BRIEF DESCRIPTION OF THE DRAWINGS

FIG. 2b is a cross sectional view illustrating an exemplary embodiment of the rigid base member of FIG. 2a.

FIG. 3a is a perspective view illustrating an exemplary embodiment of a resilient member used with the rigid base member of FIG. 2a.

FIG. 3b is a cross sectional view illustrating an exemplary embodiment of the resilient member of FIG. 3a.

FIG. 4a is a perspective view illustrating an exemplary embodiment of the rigid base member of FIG. 2a assembled with the resilient member of FIG. 3a.

FIG. 5 is a perspective view illustrating an exemplary embodiment of an information handling system chassis used with the information handling system of FIG. 1 and the rigid base member and resilient member of FIG. 4a.

FIG. 6 is a cross sectional view illustrating an exemplary embodiment of the rigid base member and resilient member of FIG. 4b assembled with the information handling system chassis of FIG. 5.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
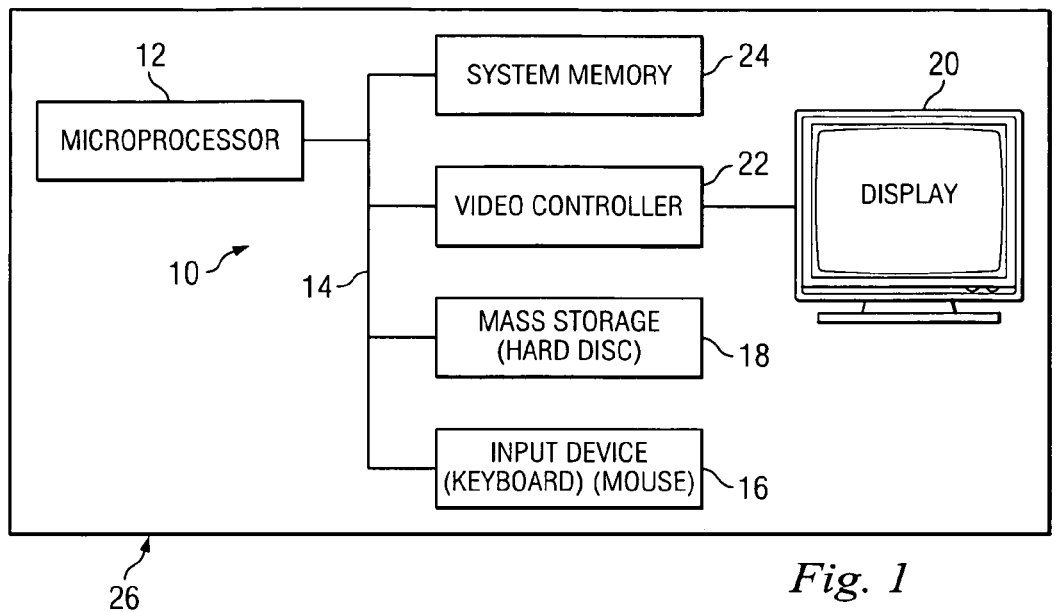
FIG. 1 is a schematic view illustrating an exemplary embodiment of an information handling system.

In one embodiment, information handling system 10, FIG. 1, includes a microprocessor 12, which is connected to a bus 14. Bus 14 serves as a connection between microprocessor 12 and other components of information handling system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Information handling system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor. In an exemplary embodiment, the microprocessor 12, input device 16, mass storage 18, display 20, video controller 22, and system memory 24 may all be mounted in a chassis 26.

Figure 2A:
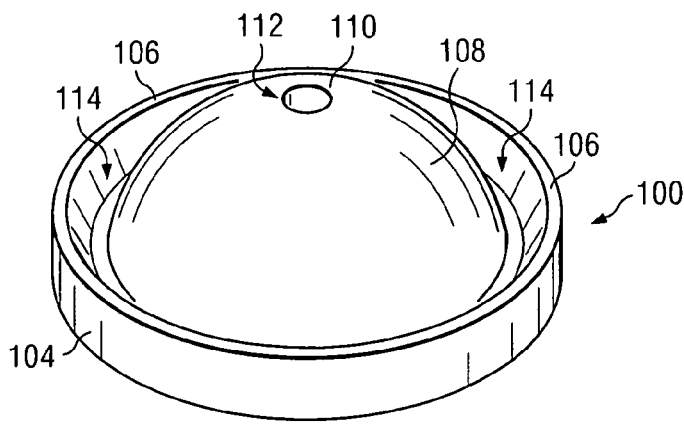
FIG. 2a is a perspective view illustrating an exemplary embodiment of a rigid base member.
Figure 2B:
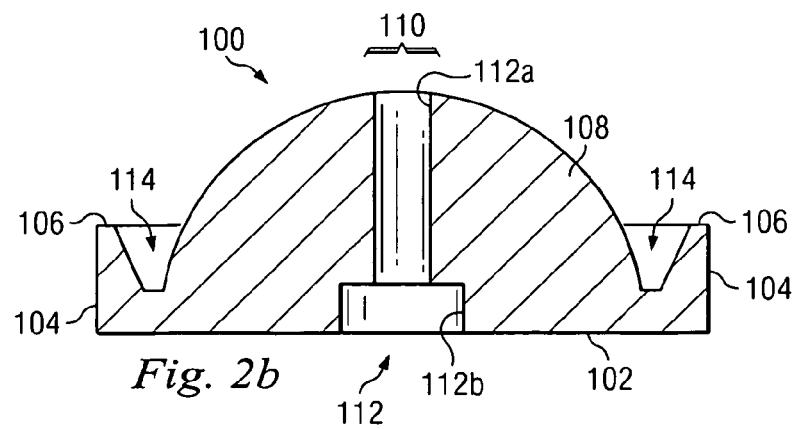

Referring now to FIGS. 2a and 2b, in an exemplary embodiment, a spacer apparatus includes a rigid base member 100 which is substantially circular in shape and includes a rear surface 102 and an outer edge 104. A circular rim 106 runs about the outer edge 104. A hemispherical top portion 108 extends from the rear surface 102 and includes a stop surface 110. The rigid base member 100 defines a substantially cylindrical channel 112 extending from the rear surface 102 and through the hemispherical top portion 108 to the stop surface 110. The channel 112 includes an upper section 112a and a lower section 112b, the lower section 112b having a greater width than the upper section 112a. The rigid base member 100 also defines a circular channel 114 running adjacent the circular rim 106. In an exemplary embodiment, the rigid base member 100 is made of a rigid material such as a hard plastic or equivalent materials known in the art. In an exemplary embodiment,the rigid base member 100 includes an adhesive on the rear surface 102.

Figure 3A:
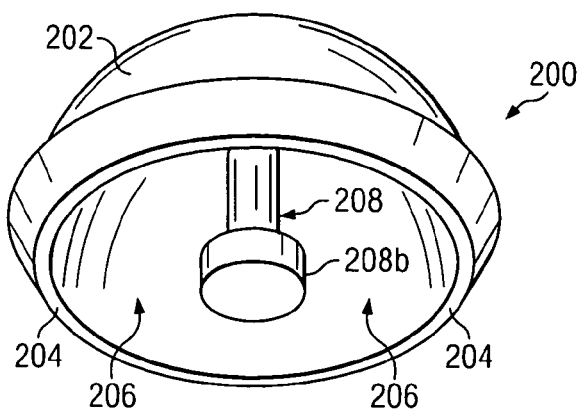
Figure 3B:
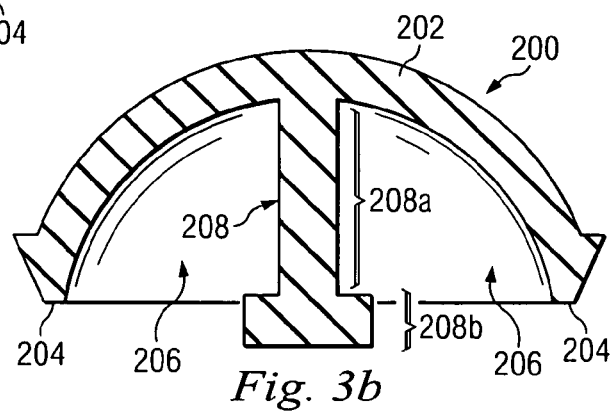
Figure 4A:
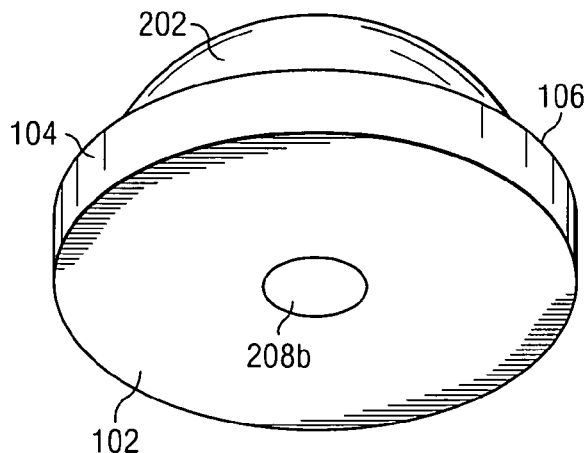
Figure 4B:
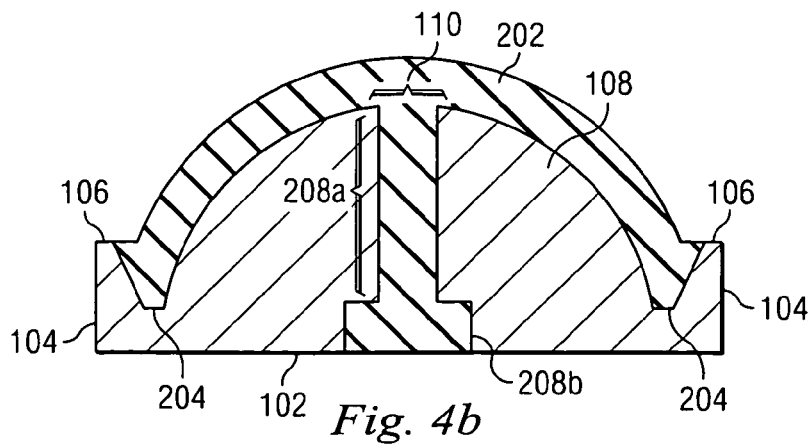
FIG. 4b is a cross sectional view illustrating an exemplary embodiment of the rigid base member of FIG. 2b assembled with the resilient member of FIG. 3b.
Figure 7A:
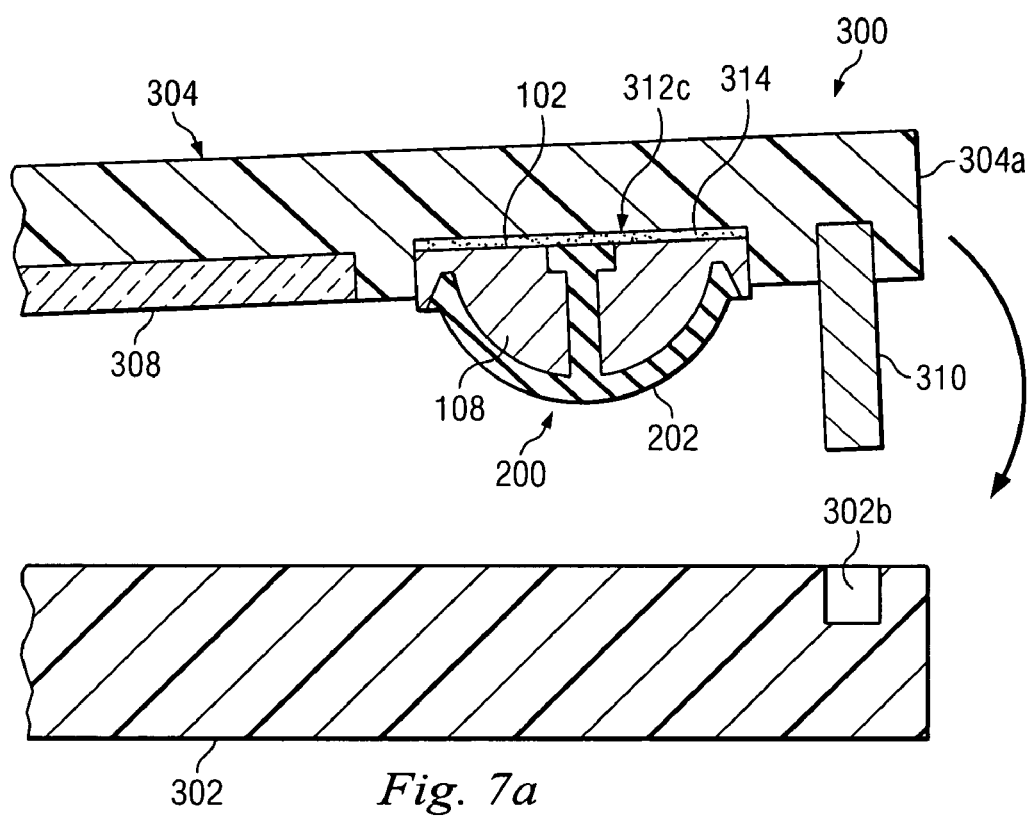
FIG. 7a is a cross sectional view illustrating an exemplary embodiment of the information handling system chassis, rigid base member, and resilient member of FIG. 6 in an open position.
Figure 7B:
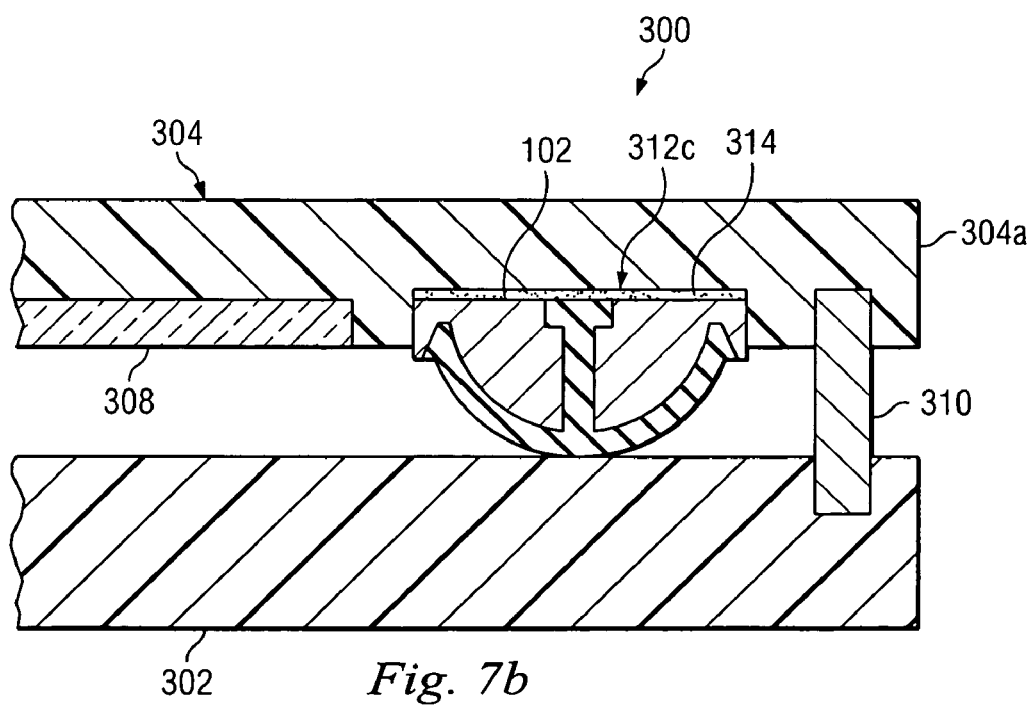
FIG. 7b is a cross sectional view illustrating an exemplary embodiment of the information handling system chassis, rigid base member, and resilient member of FIG. 6 in a latched position.

Referring now to FIGS. 3a and 3b, in an exemplary embodiment, the spacer apparatus also includes a resilient member 200 that is substantially hemispherical in shape and includes hemispherical layer 202. A circular lip 204 runs around an edge of the hemispherical layer 202. The resilient member 200 defines a substantially hemispherical channel 206 positioned adjacent the hemispherical layer 202. A securing member 208 extends from the hemispherical layer 202 and through the hemispherical channel 206. The securing member 208 includes a locating portion 208a coupled to a securing portion 208b, the securing portion 208b having a greater width than the location portion 208a. In the exemplary embodiment, the resilient member 200 is made of a non-abrasive material such as rubber or equivalent materials known in the art.

Referring now to FIGS. 2b, 3b, 4a, and 4b, the spacer apparatus is provided by coupling the resilient member 200 to the rigid base member 100 by situating locating portion 208a in upper section 112a of channel 112 and situating securing portion 208b in lower section 112b of channel 112. In an exemplary embodiment, channel 112 on rigid base member 100 and securing member 208 on resilient member 200 comprise a means for connecting rigid base member 100 and resilient member 200. With resilient member 200 coupled to rigid base member 100, circular lip 204 is positioned in circular channel 114 and hemispherical layer 202 is positioned in abutment with hemispherical top portion 108. In an exemplary embodiment, the resilient member 200 and the rigid base member 100 may be manufactured, and coupled together, in a two step molding process in which the rigid base member 100 is first molded. The rigid base member 100 may then be inverted and the resilient member 200 molded about the rigid base member 100, resulting in the locating portion 206a being positioned in the upper section 112a of channel 112 and the securing portion 206b being positioned in the lower section 112b of channel 112. In an exemplary embodiment, the resilient member 200 may not include securing member 208, and the means for connecting resilient member 200 to rigid base member 100 may include an adhesive connecting the resilient member 200 to the rigid base member 100, a clamp which holds the resilient member 200 to the rigid base member 100, or equivalent methods known in the art.

Referring now to FIG. 5, an alternative embodiment of a spacer apparatus is substantially identical in design to the spacer apparatus described above with reference to FIGS. 1, 2a, 2b, 3a, 3b, 4a, and 4b, with the addition of an information handling system chassis 300, which may be the chassis 26 illustrated in FIG. 1, which houses an information handling such as, for example, the information handling system 10 illustrated in FIG. 1. Chassis 300 includes a base 302 including a base surface 302a. Base 302 defines a securing hole 302b open to base surface 302a. Chassis 300 also includes a display housing 304 which is pivotally coupled to the base 302 by a coupling 306 such that, upon pivoting, the display housing 304 may be brought into engagement with the base surface 302a. Display housing 304 includes an upper edge 304a positioned opposite the coupling 306 and a plurality of sides edges 304b and 304c positioned perpendicular to the upper edge 304a and the coupling 306. A display 308 is mounted in the display housing 304 and, in an exemplary embodiment, includes a liquid crystal display (LCD). A latch 310 extends from the display housing 304 and is positioned adjacent the upper edge 304a of the display housing 304 such that, upon pivoting operation, the latch may engage the securing hole 302b in base 302. A plurality of apparatus mounting surfaces 312a, 312b, 312c, 312d, and 312e are positioned adjacent the upper edge 304a and the side edges 304b and 304c.

Referring now to FIG. 6, in an exemplary embodiment, a spacer apparatus is coupled to the information handling system chassis 300 by placing the rear surface 102 of rigid base member 100 on a mounting surface such as, for example, mounting surface 312b. In an exemplary embodiment, an adhesive 314 may be used to coupled the rigid base member 100 to the mounting surface 312b and may be provided on the rear surface 102 of the rigid base member 100 or may be applied to mounting surface 312b on information handling system chassis 300 before placing the rigid base member 100 on the mounting surface 312b. In an exemplary embodiment, a spacer apparatus may be placed on one, a plurality, or all of the mounting surfaces 312a, 312b, 312c, 312d, and 312e. In an exemplary embodiment, the mounting surfaces 312a, 312b, 312c, 312d, and 312e may be fastener mounting locations on the information handling system chassis 300. In an exemplary embodiment, the stop surface is positioned a height H above the display housing 304.

Referring now to FIGS. 4b, 5, 7a, and 7b, in an exemplary embodiment, in operation, a spacer apparatus is coupled to mounting surface 312c on display housing 304, adjacent to latch 310. Display housing 304 is pivoted about coupling 306 towards base 302 on information handling system chassis 300. As display housing 304 and base 302 pivot towards each other, latch 310 lines up with hole 302b. As latch 310 approaches engagement with base 302 through hole 302b, resilient member 200 comes in contact with base surface 302a. Hemispherical layer 202 may compress as latch 310 engages base 302 through hole 302b, however, stop surface 110 provides a hard limit for the pivoting motion of display housing 304 and base 302, and limits display 308 from engaging base surface 302a. In an exemplary embodiment, the compression of resilient member 200 provides compliance for the latching mechanism provided by latch 310 and hole 302b defined by base 302.

It is understood that variations may be made in the foregoing without departing from the scope of the disclosed embodiments. Furthermore, the elements and teachings of the various illustrative embodiments may be combined in whole or in part some or all of the illustrative embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A spacer apparatus comprising:
   a rigid base member including a stop surface located on a portion of the base member, wherein the rigid base member is operable to be coupled to a first chassis surface such that the stop surface is spaced apart from the first chassis surface in order to limit a second chassis surface from engaging the first chassis surface;
   a resilient member positioned to cover the stop surface; and
   means for connecting the resilient member and the rigid base member, the means for connecting including co-molding the rigid base member and the resilient member.

2. The apparatus of claim 1 wherein the rigid base member is substantially comprised of a rigid plastic material.

3. The apparatus of claim 1 wherein the rigid base member includes an adhesive surface positioned opposite the stop surface.

4. The apparatus of claim 1 wherein the means for connecting the resilient member and the rigid base member includes a coupling channel defined by the rigid base member.

5. The apparatus of claim 1 wherein the resilient member is substantially comprised of a non-abrasive material.

6. The apparatus of claim 1 wherein the means for connecting the resilient member and the rigid base member includes a coupling member on the resilient member.

7. The apparatus of claim 1 wherein the resilient member is substantially hemispherical.

8. The apparatus of claim 1 wherein the rigid base member includes a substantially hemispherical portion.

9. A chassis comprising:
   a pair of chassis surfaces operable to engage each other;
   at least one spacer apparatus mounted on one of the chassis surfaces and comprising:
      a rigid base member including a stop surface located on a portion of the base member, the stop surface spaced apart from the chassis surface on which it is mounted and operable to limit the chassis surfaces from engaging each other;
      a resilient member positioned to cover the stop surface; and
      means for connecting the resilient member and the rigid base member, the means for connecting including co-molding the rigid base member and the resilient member.

10. The chassis of claim 9 wherein the pair of chassis surfaces include surfaces in an information handling system.

11. The chassis of claim 9 wherein the rigid base member is substantially comprised of a rigid plastic material.

12. The chassis of claim 9 wherein the means for connecting the resilient member and the rigid base member includes a coupling channel defined by the rigid base member.

13. The chassis of claim 9 wherein the resilient member is substantially comprised of a non-abrasive material.

14. The chassis of claim 9 wherein the means for connecting the resilient member and the rigid base member includes a coupling member on the resilient member.

15. The chassis of claim 9 wherein the resilient member is substantially hemispherical.

16. The chassis of claim 9 wherein the rigid base member comprises a hemispherical portion.

17. An information handling system comprising:
   a chassis comprising a pair of chassis surfaces pivotally coupled together;
   a microprocessor mounted in the chassis;
   a storage coupled to the microprocessor;
   a display mounted in one of the chassis surfaces and coupled to the microprocessor; and
   at least one spacer apparatus mounted on one of the chassis surfaces and adjacent the display comprising:
      a rigid base member including a stop surface located on a portion of the base member, the stop surface spaced apart from the chassis surface on which it is mounted and operable to limit the chassis surfaces from engaging each other;
      a resilient member positioned to cover the stop surface; and
      means for connecting the resilient member and the rigid base member, the means for connecting including co-molding the rigid base member and the resilient member.

18. The system of claim 17 wherein the display comprises an LCD.

19. The system of claim 17 wherein the rigid base member is substantially comprised of a rigid plastic material.

20. The system of claim 17 wherein the means for connecting the resilient member and the rigid base member includes a coupling channel defined by the rigid base member.

21. The system of claim 17 wherein the resilient member is substantially comprised of a non-abrasive material.

22. The system of claim 17 wherein the means for connecting the resilient member and the rigid base member includes a coupling member on the resilient member.

23. The system of claim 17 wherein the resilient member is substantially hemispherical.

24. The system of claim 17 wherein the rigid base member comprises a hemispherical portion.

25. A method for supporting a display in an information handling system comprising:
- providing a pair of chassis surfaces, the chassis surfaces operable to engage each other;
- coupling at least one spacer apparatus to at least one chassis surface, the spacer apparatus comprising:
  - a rigid base member including a stop surface located on a portion of the base member and spaced apart from the at least one chassis surface;
  - a resilient member positioned to cover the stop surface; and
  - means for connecting the resilient member and the rigid base member, the means for connecting including co-molding the rigid base member and the resilient member;
- pivoting the chassis surfaces together;
- engaging the resilient member with a chassis surface; and
- preventing the engagement of the chassis surfaces with the stop surface.

* * * * *